(12) United States Patent
Kobayashi et al.

(10) Patent No.: US 8,797,116 B2
(45) Date of Patent: Aug. 5, 2014

(54) SURFACE COMMUNICATION APPARATUS

(75) Inventors: Naoki Kobayashi, Tokyo (JP); Hiroshi Toyao, Tokyo (JP)

(73) Assignee: NEC Corporation, Tokyo (JP)

( * ) Notice: Subject to any disclaimer, the term of this patent is extended or adjusted under 35 U.S.C. 154(b) by 248 days.

(21) Appl. No.: 13/320,133

(22) PCT Filed: May 10, 2010

(86) PCT No.: PCT/JP2010/057852
§ 371 (c)(1),
(2), (4) Date: Nov. 11, 2011

(87) PCT Pub. No.: WO2010/131612
PCT Pub. Date: Nov. 18, 2010

(65) Prior Publication Data
US 2012/0056693 A1    Mar. 8, 2012

(30) Foreign Application Priority Data

May 14, 2009    (JP) ................................. 2009-117697

(51) Int. Cl.
*H01P 3/00*    (2006.01)
*H01P 5/00*    (2006.01)

(52) U.S. Cl.
USPC ......................................... 333/24 R; 333/186

(58) Field of Classification Search
USPC ......... 333/141, 147, 149, 150, 154, 186, 187, 333/193, 24 R; 310/328, 334
See application file for complete search history.

(56) References Cited

U.S. PATENT DOCUMENTS

| | | | | |
|---|---|---|---|---|
| 6,121,856 | A * | 9/2000 | Apostolos | 333/141 |
| 7,804,383 | B2 * | 9/2010 | Volatier et al. | 333/189 |
| 8,525,619 | B1 * | 9/2013 | Olsson et al. | 333/187 |
| 2012/0206314 | A1 * | 8/2012 | Kobayashi | 343/841 |
| 2013/0193772 | A1 * | 8/2013 | Kobayashi | 307/104 |
| 2013/0214613 | A1 * | 8/2013 | Kobayashi | 307/104 |

FOREIGN PATENT DOCUMENTS

| | | |
|---|---|---|
| JP | 2007159082 A | 6/2007 |
| JP | 2008206074 A | 9/2008 |
| JP | 2008295176 A | 12/2008 |

OTHER PUBLICATIONS

International Search Report for PCT/JP2010/057852 mailed Aug. 10, 2010.
H. Shinoda et al., "Surface Sensor Network . . . " article, in Measurement and Control, vol. 46, No. 2, Feb 2007, pp. 98-103.
Y. Makino et al., "Study of flexible-form interface . . . " article, Thesis at Dept. of System Information of Tokyo University, dated year 2006.

* cited by examiner

*Primary Examiner* — Dean O Takaoka
(74) *Attorney, Agent, or Firm* — Sughrue Mion, PLLC

(57) ABSTRACT

Provided is a surface communication apparatus that includes: propagation sheet through which electromagnetic waves are propagated; an electromagnetic wave transmission unit disposed on a surface of propagation sheet to transmit the electromagnetic waves to propagation sheet, and an electromagnetic wave reception unit disposed on the surface of propagation sheet to receive the electromagnetic waves propagated through propagation sheet. The electromagnetic wave transmission unit includes an electromagnetic wave generator, and a transmission electromagnetic wave coupler that couples electromagnetic waves generated by the electromagnetic wave generator with propagation sheet. The electromagnetic wave reception unit includes a reception electromagnetic wave coupler that couples the electromagnetic waves propagated through propagation sheet, and an electromagnetic wave output unit that outputs the electromagnetic waves coupled by the reception electromagnetic wave coupler. Propagation sheet has a periodic structure that sets wavelengths of the electromagnetic waves propagated through propagation sheet to be longer than the length of propagation sheet in its extending direction.

16 Claims, 17 Drawing Sheets

SURFACE COMMUNICATION APPARATUS

This application claims priority from PCT Application No. PCT/JP2010/057852 filed May 10, 2010, and from Japanese Patent Application No. 2009-117697 filed May 14, 2009, which applications are incorporated herein by reference.

TECHNICAL FIELD

The present invention relates to a technology for supplying, for example, power to a load. More particularly, the present invention relates to a surface communication apparatus that acquires power from an electromagnetic wave propagated through a propagation sheet to supply it to the load.

BACKGROUND ART

Concerning a communication method that uses electromagnetic waves, there has been proposed a wireless reception method structured in a manner that a sheet-shaped medium is used as a communication medium, a power feeding device for wireless power feeding is disposed in a nonconductive state in the sheet-shaped medium, and a reception side of the electromagnetic waves is also arranged in a nonconductive state in the sheet-shaped medium. Hereinafter, this communication method is referred to as surface communication. The sheet-shaped medium is configured to propagate the electromagnetic waves through a narrow area sandwiched by a pair of conductors located to face each other (e.g., refer to Patent Literature 1). Nonpatent Literature 1 discusses a principle of power communication through the sheet-shaped medium.

Nonpatent Literature 1 proposes, for the surface communication, a method to enable communication between two points on a two-dimensional sheet. Generally, it is preferred that power transport efficiency, namely, communication performance, between a power transmission unit and the reception unit, not be dependent on the position of the power transmission unit or the reception unit on the sheet. However, when an end of the sheet is open, an electromagnetic wave is reflected at the end of the sheet to generate a standing wave. As a result, when the size of a sheet is larger or nearly equal to the wavelength of the electromagnetic wave, intensity fluctuation occurs in electromagnetic field distribution on the sheet. Hence, Nonpatent Literature 2 discusses that the degree of electric coupling between the power transmission unit or the reception unit and a communication sheet depends on the position on the sheet.

In particular, when a standing wave distribution on the sheet corresponds to a voltage node, there is concern that the communication performance will greatly decline. Nonpatent Literature 2 also discusses a method of suppressing the generation of standing waves by disposing a resistor at the end of the sheet. In the case of this method, however, the resistor consumes power as heat, and hence reduction in communication performance cannot be prevented.

CITATION LIST

Patent Literature

Patent Literature 1: JP2008-295176A

Nonpatent Literature

Nonpatent Literature 1: pp. 98 to 103, "High-speed sensor network formed on material surface" in Measurement and Control, by Hiroyuki Shinoda, Vol. 46, second edition, February, 2007

Nonpatent Literature 2: pp. 28 and 29, "Study of flexible-form interface based on two-dimensional signal transmission technology", by Yasutoshi Makino, Ph.D thesis at the Department of System information of Tokyo University, 2006

SUMMARY OF INVENTION

In the abovementioned surface communication relating to the present invention, depending on the positional relationship of the transmission unit or the reception unit with the electromagnetic wave propagation sheet, the communication performance changes. In particular, when the transmission unit or the reception unit is set in a position where voltage distribution on the electromagnetic wave propagation sheet becomes the node of a standing wave, there is concern that communication performance may be greatly reduced.

It is therefore an object of the present invention to provide a surface communication apparatus that can solve the problem of the related art. An example of the object is to enable efficient transmission and reception of power between an electromagnetic wave transmission unit and an electromagnetic wave reception unit irrespective of a positional relationship between the electromagnetic wave transmission unit or the electromagnetic wave reception unit and a sheet-shaped electromagnetic wave propagation unit.

To achieve the object, according to an aspect of the present invention, a surface communication apparatus includes: a sheet-shaped electromagnetic wave propagation unit which propagates electromagnetic waves; an electromagnetic wave transmission unit which is disposed on a surface of the electromagnetic wave propagation unit and which transmits electromagnetic waves to the electromagnetic wave propagation unit; and an electromagnetic wave reception unit which is disposed on the surface of the electromagnetic wave propagation unit and which receives the electromagnetic waves propagated through the electromagnetic wave propagation unit. The electromagnetic wave transmission unit includes an electromagnetic wave generator and a transmission electromagnetic wave coupler which couples electromagnetic waves generated by the electromagnetic wave generator with the electromagnetic wave propagation unit. The electromagnetic wave reception unit includes a reception electromagnetic wave coupler which couples the electromagnetic waves propagated through the electromagnetic wave propagation unit, and an electromagnetic wave output unit which outputs the electromagnetic waves coupled by the reception electromagnetic wave couple. The electromatmetic wave propagation unit has a periodic structure that sets wavelengths of the electromagnetic waves propagated through the electromagnetic wave propagation unit to be longer than the length of the sheet-shaped electromagnetic wave propagation unit in an extending direction.

According to the present invention, the extending direction indicates a two-dimensional direction where the electromagnetic wave propagation unit extends in a sheet shape. In other words, according to the present invention, the electromagnetic wave propagation unit has a periodic structure that sets a wavelength of an electromagnetic wave propagated through the electromagnetic wave propagation unit to be longer than lengths in two-axis directions constituting a plane of the electromagnetic wave propagation unit.

According to the present invention, no standing wave node appears at the sheet-shaped electromagnetic wave propagation unit, and dependence of the communication performance on the distance from the electromagnetic wave transmission unit to the electromagnetic wave reception unit can be reduced. Thus, according to the present invention, power can be efficiently transmitted and received between the electromagnetic wave transmission unit and the electromagnetic wave reception unit irrespective of the positional relationship between the electromagnetic wave transmission unit or the electromagnetic wave reception unit and the sheet-shaped electromagnetic wave propagation unit.

DESCRIPTION OF EMBODIMENTS

Hereinafter, embodiments of the present invention are described. The embodiments described below are only examples, and are in no way limitative of the scope of the present invention. Thus, those skilled in the art can employ embodiments where some or all components of the embodiments are replaced by equivalents, and these embodiments are also within the scope of the present invention.

First Embodiment

Figure 1:
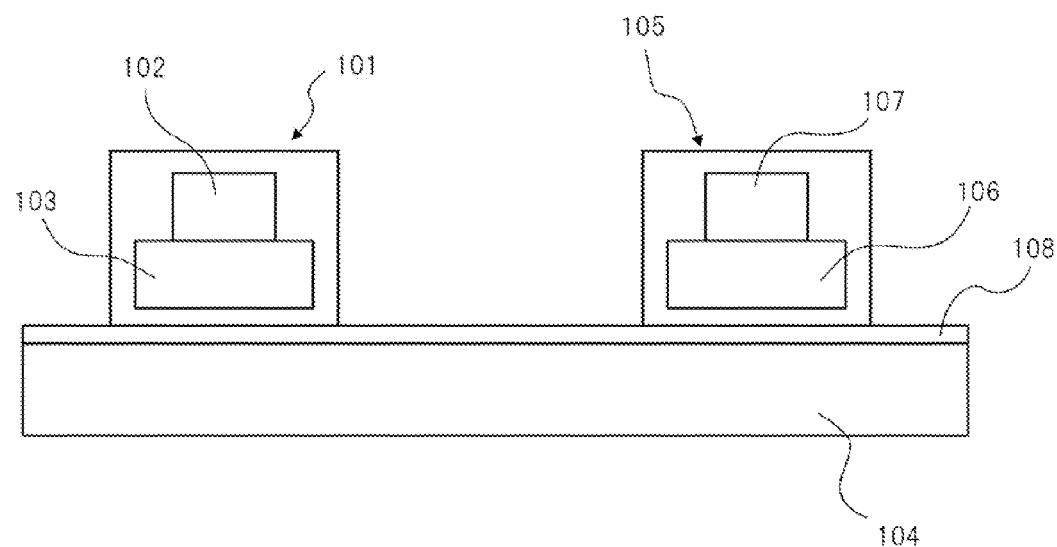
FIG. 1 is a view schematically showing a surface communication apparatus according to a first embodiment.

FIG. 1 is a side view showing an outline configuration of a surface communication apparatus according to a first embodiment. Electromagnetic wave transmission unit 101 includes electromagnetic wave generator 102 and transmission electromagnetic wave coupler 103 that couples an electromagnetic wave generated by electromagnetic wave generator 102 with an electromagnetic wave propagation unit. Electromagnetic wave propagation unit 104 formed into a sheet shape has a structure that sufficiently reduces a phase change (phase difference) of an electromagnetic wave propagated in an extending direction parallel to a principal surface of electromagnetic wave propagation unit 104. Electromagnetic wave reception unit 105 includes reception electromagnetic wave coupler 106 that receives the electromagnetic wave propagated through electromagnetic wave propagation unit 104, and electromagnetic wave output unit 107 that outputs the electromagnetic wave received by reception electromagnetic wave coupler 106.

To prevent conduction between electromagnetic wave transmission unit 101 or electromagnetic wave reception unit 105 and electromagnetic wave propagation unit 104, insulating layer 108 is formed on a contact surface of electromagnetic wave propagation unit 104. A medium for insulating layer 108 has a predetermined dielectric constant and a predetermined magnetic permeability, and transmits no direct current. Such media include air and vacuum.

As described above, electromagnetic wave transmission unit 101 and electromagnetic wave reception unit 105 are insulated from electromagnetic wave propagation unit 104 via insulating layer 108. However, these units may not always be insulated.

Figure 2:
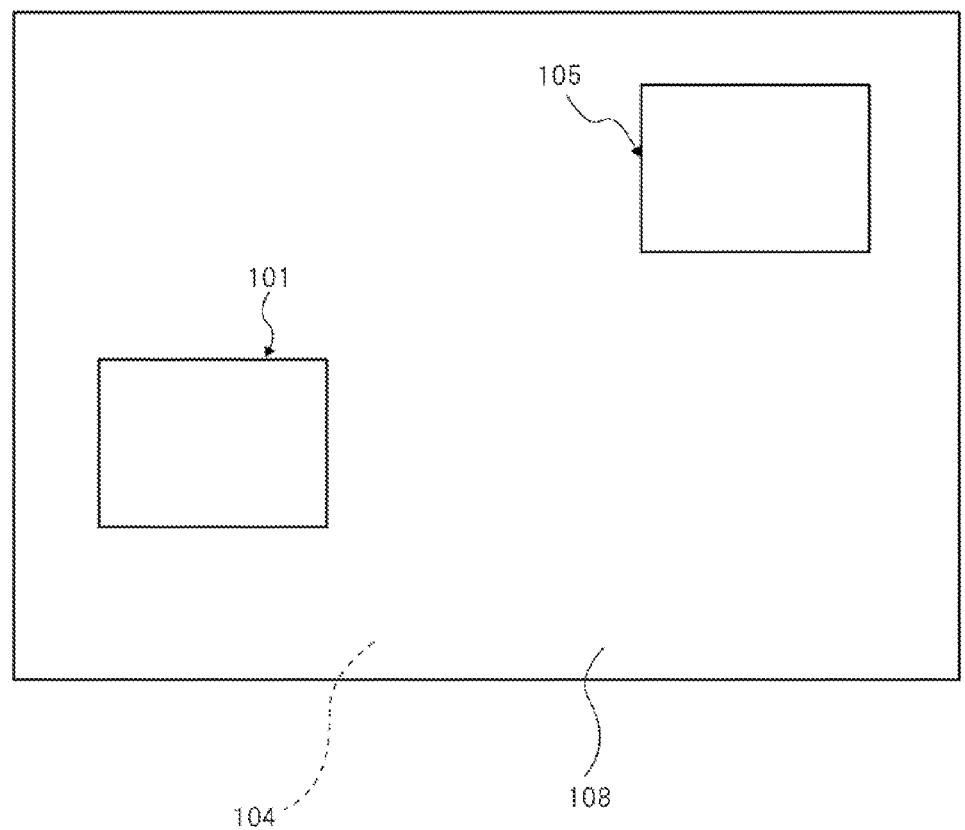
FIG. 2 is a plan view schematically showing the surface communication apparatus according to the first embodiment.

FIG. 2 is a plan view showing the outline configuration shown in FIG. 1 from above a propagation sheet. Electromagnetic-wave transmission unit 101 and electromagnetic wave reception unit 105 can be located in arbitrary places on the propagation sheet included in electromagnetic wave propagation unit 104. When necessary, electromagnetic wave propagation unit 104 can include a plurality of electromagnetic wave transmission units 101.

The sheet shape is spread in the shape of a surface such as a cloth shape, a paper shape, a foil shape, a plate shape, a membrane shape, a film shape, or a mesh shape, and is thin.

The structure of electromagnetic wave propagation unit 104 sufficiently reduces a phase change of the electromagnetic wave at both ends of the propagation sheet with a frequency of the propagated electromagnetic wave. The structure that satisfies the abovementioned conditions can be achieved by arraying specific unit structures two-dimensionally or in a two-dimensional mesh shape (in a grid) in the extending direction of the propagation sheet.

The extending direction means a two-dimensional direction where electromagnetic wave propagation unit 104 extends in a sheet shape. In other words, electromagnetic wave propagation unit 104 has a periodic structure that sets a wavelength of an electromagnetic wave propagated through electromagnetic wave propagation unit 104 to be longer than lengths in two-axis directions constituting a plane of electromagnetic wave propagation unit 104.

Structure examples of the electromagnetic wave propagation unit used in the embodiment of the present invention are described. The structures described below are only examples, hence they are in no way limitative of the scope of the present invention. Thus, those skilled in the art can employ structure examples where some or all components of the structure examples are replaced by equivalents, and embodiments using these structure examples are also within the scope of the present invention.

In each embodiment below, each structure example of the electromagnetic wave propagation unit is independently described. However, concerning relative advantages of the structure examples, prevention of coupling loses caused by a combination with an internal structure of electromagnetic wave transmission unit 101 or electromagnetic wave reception unit 105 is one basic index. For the structure of electromagnetic wave transmission unit 101 or electromagnetic wave reception unit 105, Nonpatent Literature 2 discusses a plurality of structures such as a parallel plate conductor type and a circular helical conductor type, and it is expected that various new structures will be proposed in the future. Thus, for each structure of the electromagnetic wave propagation unit in each embodiment, an optimal combination can be selected according to the structure of the electromagnetic wave transmission unit.

In Figure corresponding to each embodiment below, a coordinate axis direction is set. Unless specifically described, a direction perpendicular to electromagnetic wave transmission unit 104, namely, a surface of the propagation sheet, is set as a Y axis direction, and the extending direction parallel to the surface of the propagation sheet is set as a Z axis direction or an X axis direction.

Figure 3:
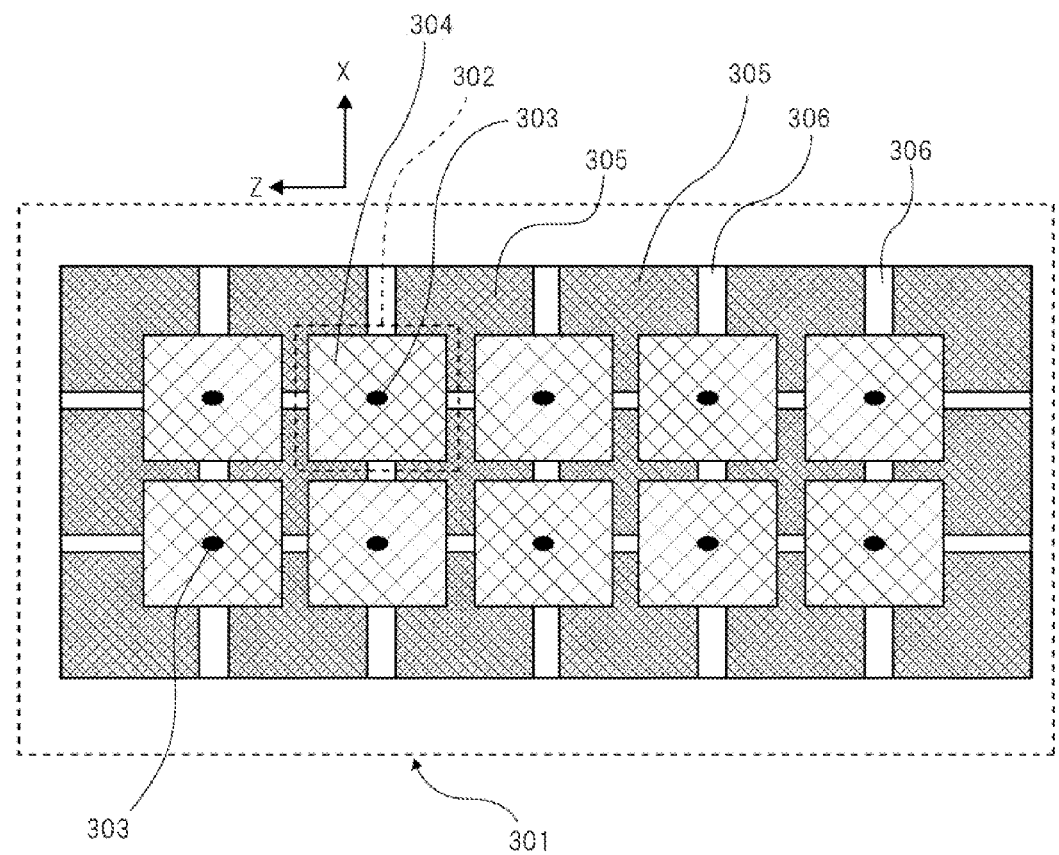
FIG. 3 is a plan view showing an electromagnetic wave propagation unit (propagation sheet) according to the first embodiment.
Figure 4:
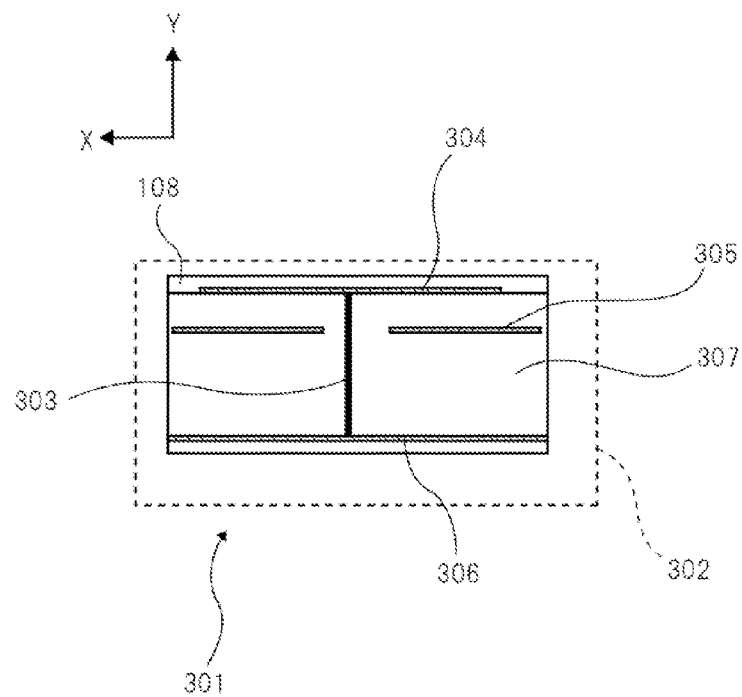
FIG. 4 is a side view showing a unit structure of the propagation sheet according to the first embodiment.

FIG. 3 is a plan view showing propagation sheet 301 included in electromagnetic wave propagation unit 104 according to the first embodiment. FIG. 4 is a side view showing a unit structure of propagation sheet 301. As shown in FIG. 3, propagation sheet 301 has unit structure 302. Upper layer patch 304 is a conductor patch that constitutes an upper conductor layer formed on propagation sheet 301. Intermediate layer patch 305 is a conductor patch that constitutes an intermediate conductor layer of propagation sheet 301. Below intermediate layer patch 305, ground conductors (reference conductor planes) 306 are arranged as lower conductor layers all over in the extending direction of propagation sheet 301. Upper layer patch 304 and ground conductor 306 are electrically connected to each other via conductor post 303.

Propagation sheet 301 includes dielectric layer 307 that is an insulating layer formed to prevent conductor contact between upper layer patch 304 and intermediate layer patch 305 and between intermediate layer patch 305 and ground conductor 306. In particular, an area of dielectric layer 307 sandwiched between intermediate layer patch 305 and ground conductor 306 is for propagating an electromagnetic wave supplied from electromagnetic wave transmission unit 101 in the X direction and the Z direction that are extending directions where propagation sheet 301 spreads in the sheet shape.

According to the embodiment, forming the periodic structure where unit structures 302 are periodically arranged in the two-dimensional direction (X and Z axis directions) enables sufficient reduction of a phase change (phase difference) of the electromagnetic wave propagated in the extending direction of the sheet shape with respect to a transmission frequency of electromagnetic wave transmission unit 101.

Figure 5:
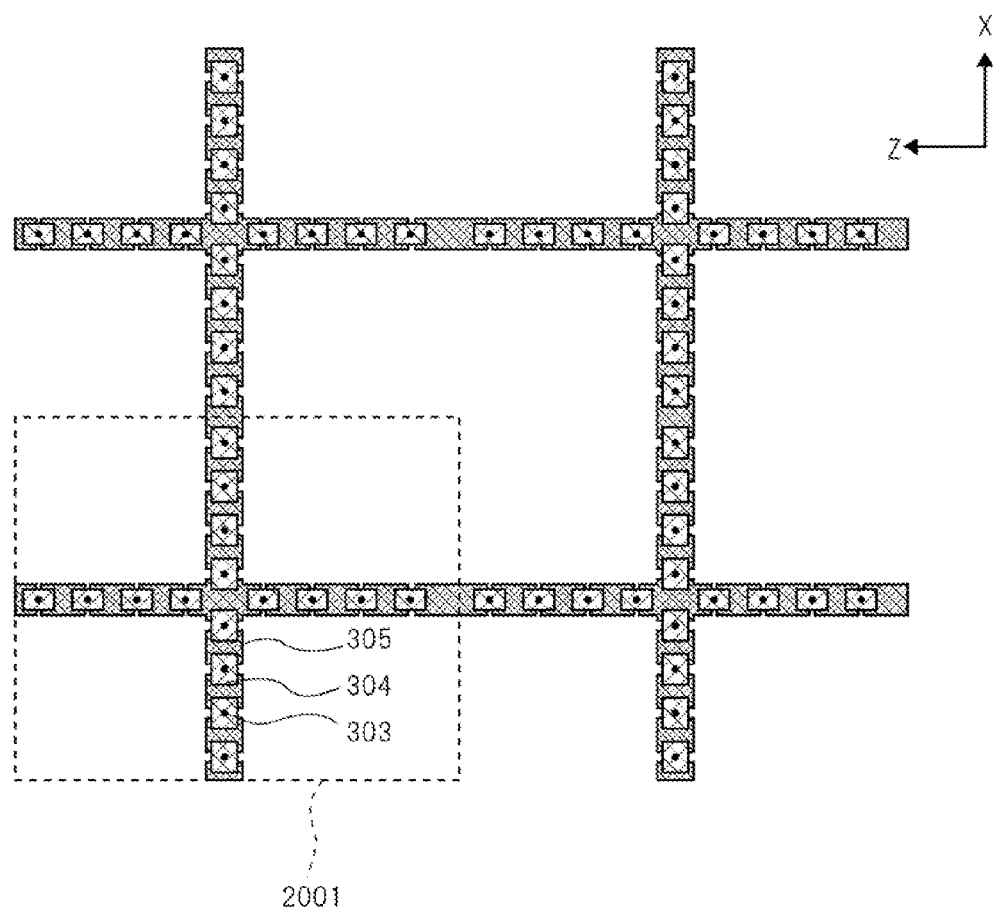
FIG. 5 is a plan view showing a case where a periodic structure of the propagation sheet is formed into a net shape according to the first embodiment.

FIG. 3 shows the configuration where unit structures 302 are periodically arranged in the two-dimensional directions (X and Z axis directions). However, as shown in FIG. 5, unit structures 302 can be arranged in a net shape. A propagation sheet shown in FIG. 20 includes unit structures 2001 formed into a two-dimensional net structure. The net structure of unit structures 2001 provides an effect of reducing coupling loss of electromagnetic waves by forming electromagnetic wave transmission unit 101 or electromagnetic wave reception unit 105 into a predetermined structure.

As described above, according to the embodiment, propagation sheet 301 included in electromagnetic wave propagation unit 104 has the periodic structure that sets the wavelength of the electromagnetic wave propagated through propagation sheet 301 to be longer than the length in the extending direction. This enables propagation sheet 301 to sufficiently reduce the phase change of the electromagnetic wave propagated in the extending direction with respect to the transmission frequency of electromagnetic wave transmission unit 101. The sufficient reduction of the phase change of the electromagnetic wave propagated in the extending direction means a reduction of amplitude fluctuation in the extending direction, and hence any standing wave node is prevented from occurring. Thus, according to the embodiment, sheet size dependence of the phase change of the electromagnetic wave propagated in the extending direction of propagation sheet 301 can be sufficiently reduced. As a result, according to the embodiment, communication efficiency can be improved between electromagnetic wave transmission unit 101 and electromagnetic wave reception unit 105 irrespective of a positional relationship between electromagnetic wave transmission unit 101 or electromagnetic wave reception unit 105 and propagation sheet 301.

It is preferred that in the propagation sheet included in electromagnetic wave propagation unit 104, an angle of the phase difference of the electromagnetic wave propagated in the extending direction be set within 90 degrees with respect to the transmission frequency of electromagnetic wave transmission unit 101. This reduces the phase change of the electromagnetic wave propagated in the extending direction of electromagnetic wave propagation unit 104 with respect to the transmission frequency of electromagnetic wave transmission unit 101. As a result, power can be efficiently transmitted and received between electromagnetic wave transmission unit 101 and electromagnetic wave reception unit 105.

Second Embodiment

Figure 6:
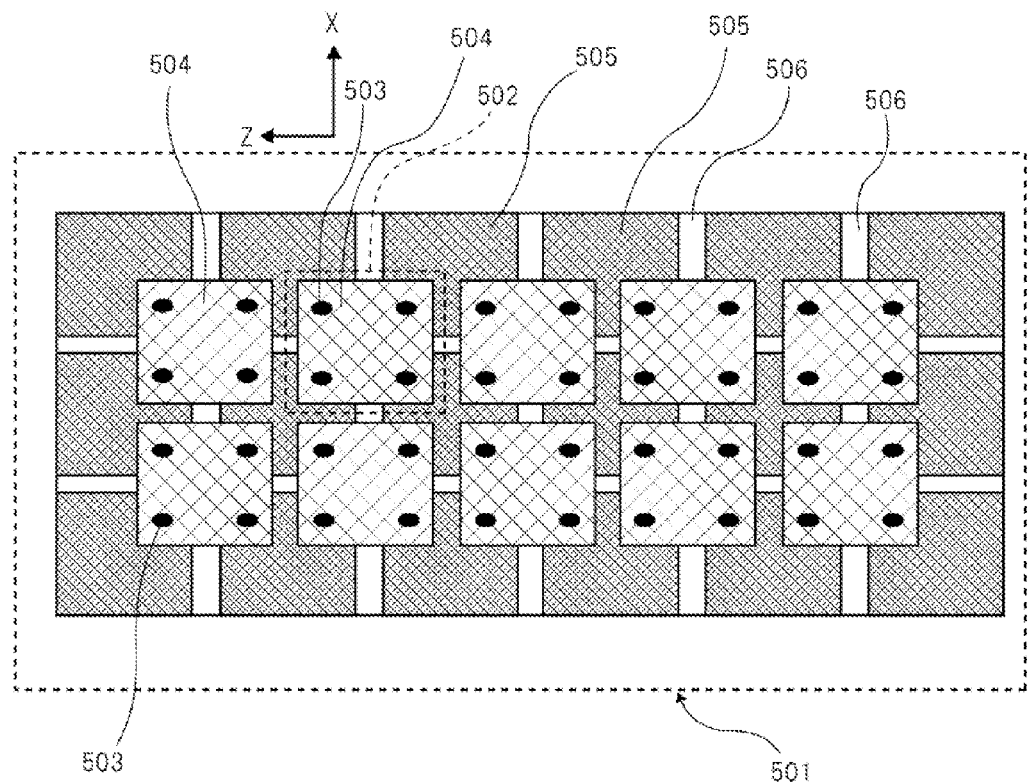
FIG. 6 is a plan view showing a propagation sheet according to a second embodiment.
Figure 7:
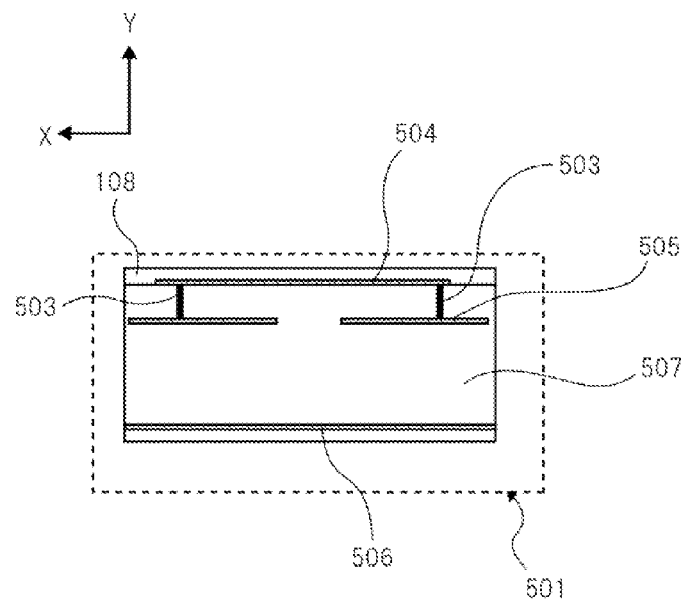
FIG. 7 is a side view showing a unit structure of the propagation sheet according to the second embodiment.

FIG. 6 is a plan view showing propagation sheet 501 included in electromagnetic wave propagation unit 104 according to a second embodiment. FIG. 7 is a side view showing a unit structure of propagation sheet 501. As shown in FIG. 6, propagation sheet 501 has unit structure 502. Upper layer patch 504 is a conductor patch formed on propagation sheet 501. Intermediate layer patch 505 is a conductor patch that constitutes an intermediate conductor layer of propagation sheet 501. Below intermediate layer patch 505, ground conductors 506 are arranged all over in an extending direction of propagation sheet 501. Upper layer patch 504 and ground conductor 506 are electrically connected to each other via conductor post 503.

Propagation sheet 501 includes dielectric layer 507 that is an insulating layer formed to prevent conductor contact between upper layer patch 504 and intermediate layer patch 505 and between intermediate layer patch 505 and ground conductor 506. In particular, an area of dielectric layer 507 sandwiched between intermediate layer patch 505 and ground conductor 506 is for propagating an electromagnetic wave supplied from electromagnetic wave transmission unit 101 in an X direction and a Z direction that are extending directions of propagation sheet 501.

Figure 8:
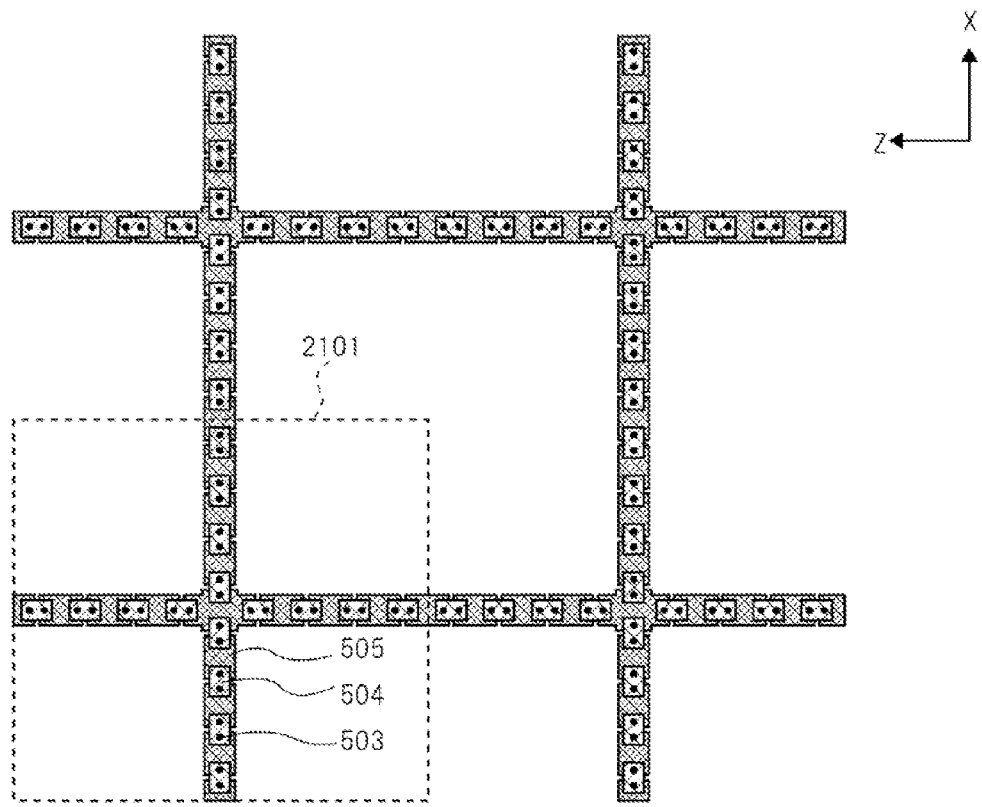
FIG. 8 is a plan view showing a case where a periodic structure of the propagation sheet is formed into a net shape according to the second embodiment.

FIG. 6 shows a configuration where unit structures 502 are periodically arranged in a two-dimensional directions (X and Z axis directions). However, as shown in FIG. 8, unit structures 302 can be arranged in a net shape. A propagation sheet shown in FIG. 8 includes unit structures 2101 formed into a two-dimensional net structure. The net structure of unit structures 2101 provides an effect of reducing coupling loss of electromagnetic waves by forming the internal structure of electromagnetic wave transmission unit 101 or electromagnetic wave reception unit 105 into a predetermined structure.

According to the embodiment, as in the case of the first embodiment, forming propagation sheet 501 of the periodic structure enables efficient transmission of power between electromagnetic wave transmission unit 101 and electromagnetic wave reception unit 105.

Third Embodiment

Figure 9A:
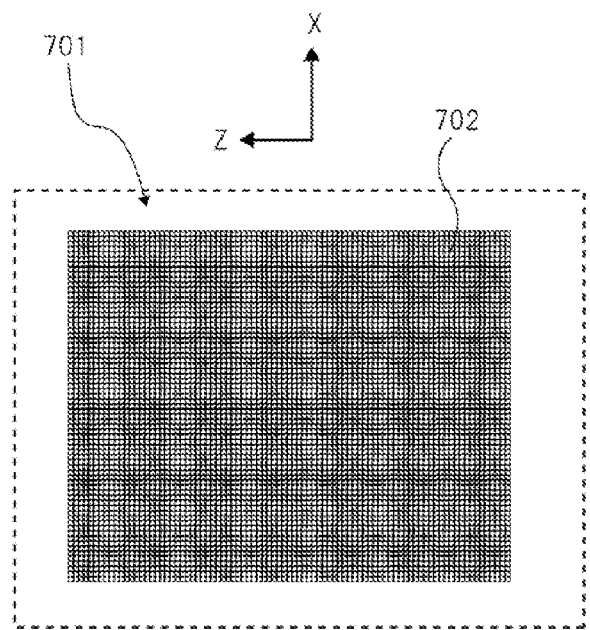
FIG. 9A is a plan view showing a propagation sheet according to a third embodiment.
Figure 9B:
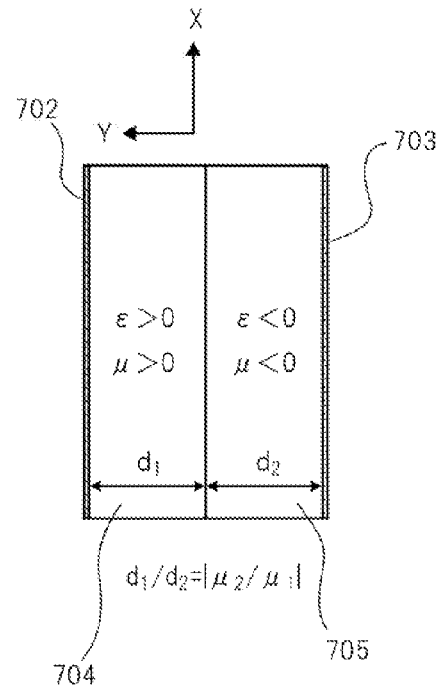
FIG. 9B is a side view showing a unit structure of the propagation sheet according to the third embodiment.

FIG. 9A is a plan view showing propagation sheet 701 included in electromagnetic wave propagation unit 104 according to a third embodiment. FIG. 9B is aside view showing a unit structure of propagation sheet 701. Upper conductor layer 702 is formed on propagation sheet 701. As in the case of the structure discussed in Nonpatent Literature 1, upper conductor layer 702 is a wiring layer formed into a net-shaped microstrip wiring structure. Propagation sheet 701 includes ground conductor (reference conductor plane) 703 that is a lower conductor layer. Between upper conductor layer 702 and ground conductor 703, as a first layer and a second layer respectively including a first medium and a second medium different from each other, a two-layer structure where first dielectric layer 704 and second dielectric layer 705 are stacked is formed.

First dielectric layer 704 is an insulating layer, and both a dielectric constant and a magnetic permeability have positive values. Second dielectric layer 705 is an insulating layer in which metal bands formed into predetermined shapes are periodically embedded. Second dielectric layer 705 is formed so that a dielectric constant and a magnetic permeability can both be negative at a frequency band for propagating electromagnetic waves.

A relationship between a thickness d1 and a magnetic permeability p1 of first dielectric constant 704 and a thickness d2 and a magnetic permeability p2 of second dielectric layer 705, approximately represented by the following expression (1) is satisfied.

$$d2/d1=|\mu 1/\mu 2| \quad (1)$$

Figure 10:
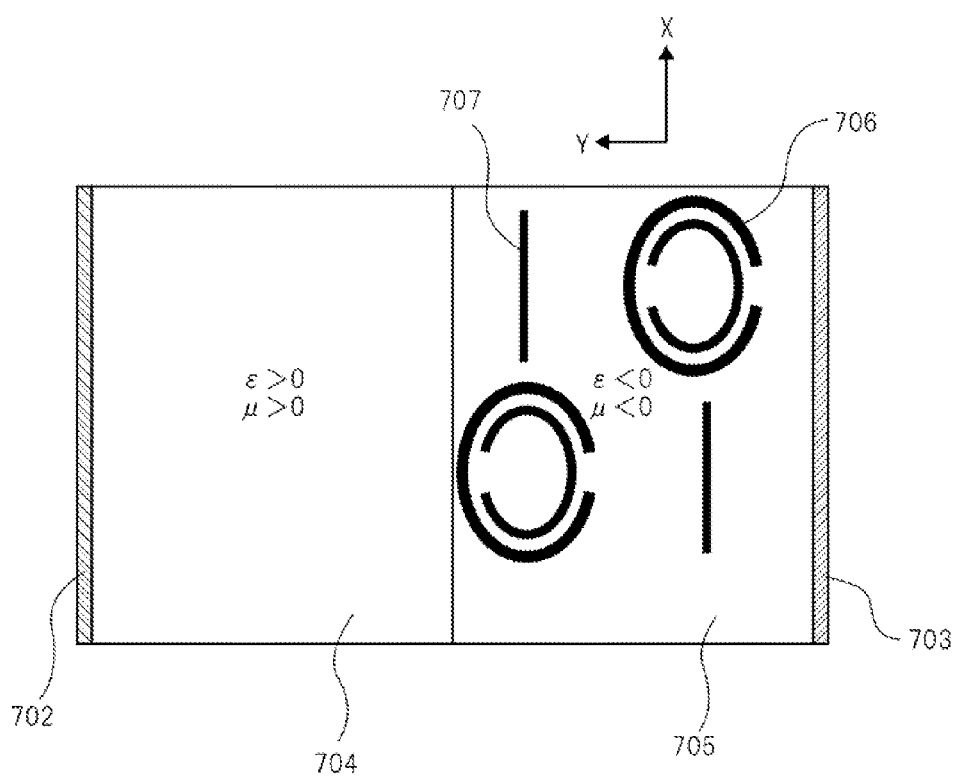
FIG. 10 is a side view showing a more specific unit structure of the propagation sheet according to the third embodiment.

FIG. 10 is a schematic view showing a configuration example of second dielectric layer 705 shown in FIG. 9B. Specifically, as shown in FIG. 10, in second dielectric layer 705, there is formed a periodic structure where a plurality of split ring resonators 706 and a plurality of linear wires 707 are alternately arranged in an extending direction of propagation sheet 701.

According to the embodiment, as in the case of the first and second embodiments, forming propagation sheet 701 of the periodic structure enables efficient transmission of power between electromagnetic wave transmission unit 101 and electromagnetic wave reception unit 105.

Fourth Embodiment

Figure 11A:
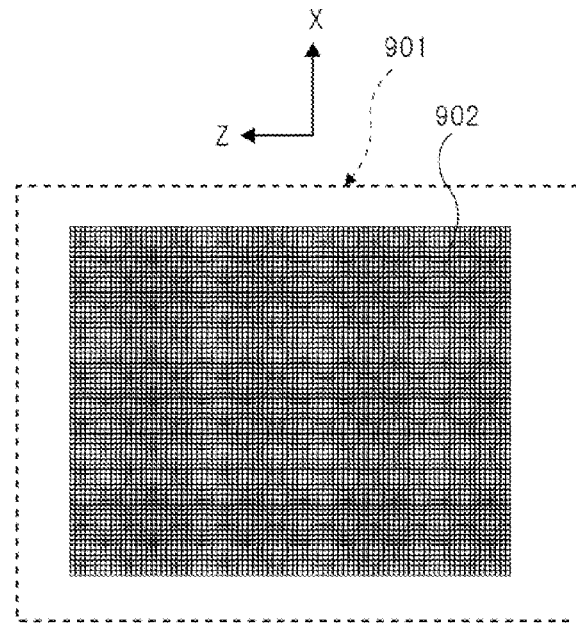
FIG. 11A is a plan view showing a propagation sheet according to a fourth embodiment.
Figure 11B:
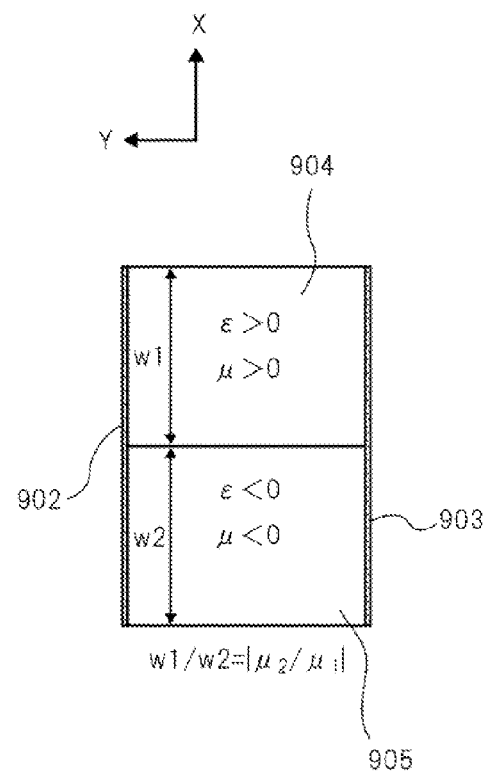
FIG. 11B is a side view showing a unit structure of the propagation sheet according to the fourth embodiment.

FIG. 11A is a plan view showing propagation sheet 001 included in electromagnetic wave propagation unit 104 according to a fourth embodiment. FIG. 11B is a side view showing a unit structure of propagation sheet 901. Upper conductor layer 902 is formed on propagation sheet 901. As in the case of the structure discussed in Nonpatent Literature 1, upper conductor layer 902 is a wiring layer formed into a net-shaped microstrip wiring structure. Propagation sheet 901 includes ground conductor (reference conductor plane) 903 that is a lower conductor layer. Between upper conductor layer 902 and ground conductor 903, as areas including different media, first dielectric area 904 and second dielectric area 905 are periodically arranged in an extending direction of propagation sheet 901.

First dielectric area 904 is a first area where a dielectric having a dielectric constant and a magnetic permeability both set to positive values is located. Second dielectric area 905 is a second area having a dielectric in which metal bands formed into predetermined shapes are periodically embedded. Second dielectric area 905 is formed so that a dielectric constant and a magnetic permeability can both be negative at a frequency band for propagating electromagnetic waves.

A relationship between a width w1 and a magnetic permeability μ1 of first dielectric area 904 and a width w2 and a magnetic permeability μ2 of second dielectric area 905, approximately represented by following expression (2) is satisfied.

$$w2/w1=|\mu 1/\mu 2| \quad (2)$$

Figure 12:
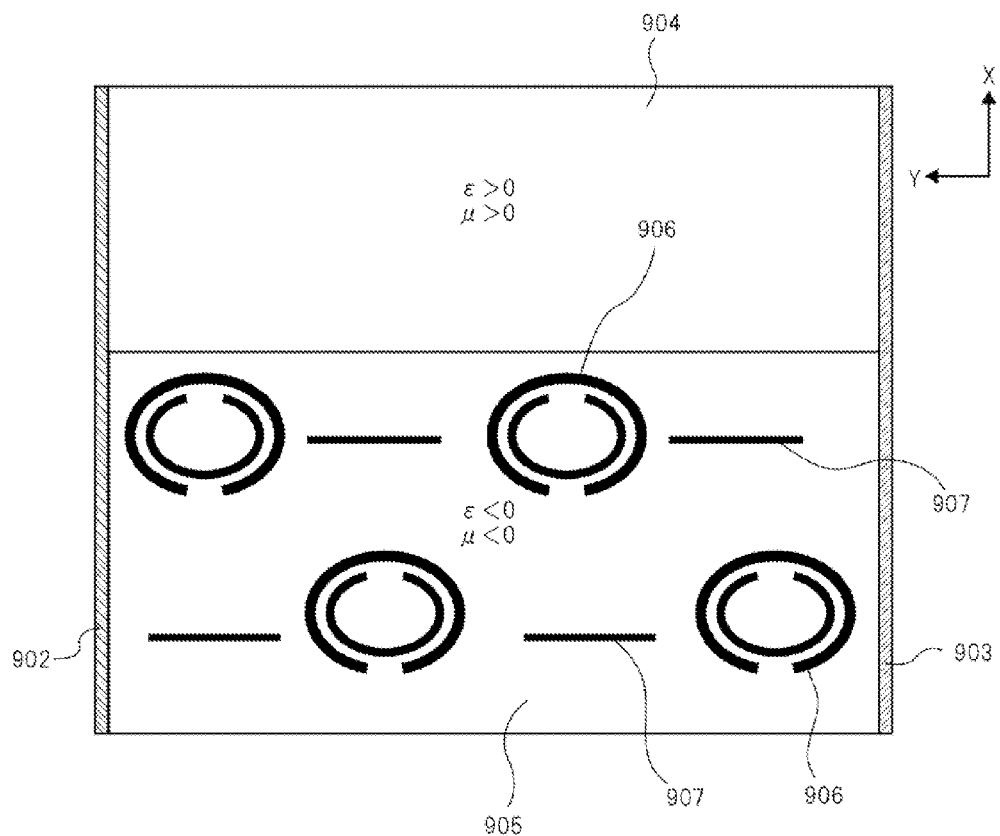
FIG. 12 is a side view showing a more specific unit structure of the propagation sheet according to the fourth embodiment.

FIG. 12 is a schematic view showing a configuration example of second dielectric area 905 shown in FIG. 11B. Specifically, as shown in FIG. 10, in second dielectric layer 905, there is formed a periodic structure where a plurality of split ring resonators 906 and a plurality of linear wires 907 are alternately arranged in a thickness direction (Y axis direction) of propagation sheet 901.

According to the embodiment, as in the case of the first to third embodiments, forming propagation sheet 901 of the periodic structure enables efficient transmission of power between electromagnetic wave transmission unit 101 and electromagnetic wave reception unit 105.

Fifth Embodiment

Figure 13:
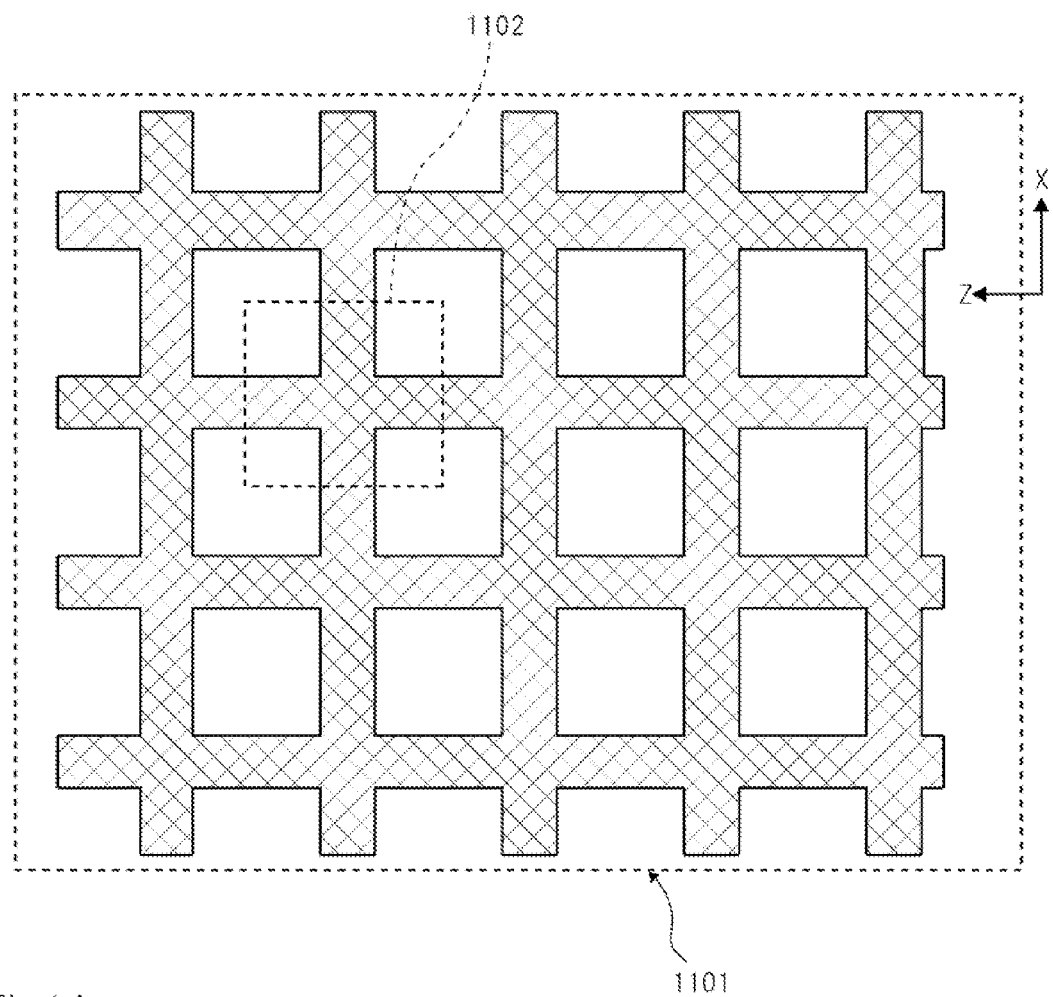
FIG. 13 is a plan view showing a propagation sheet according to a fifth embodiment.
Figure 14:
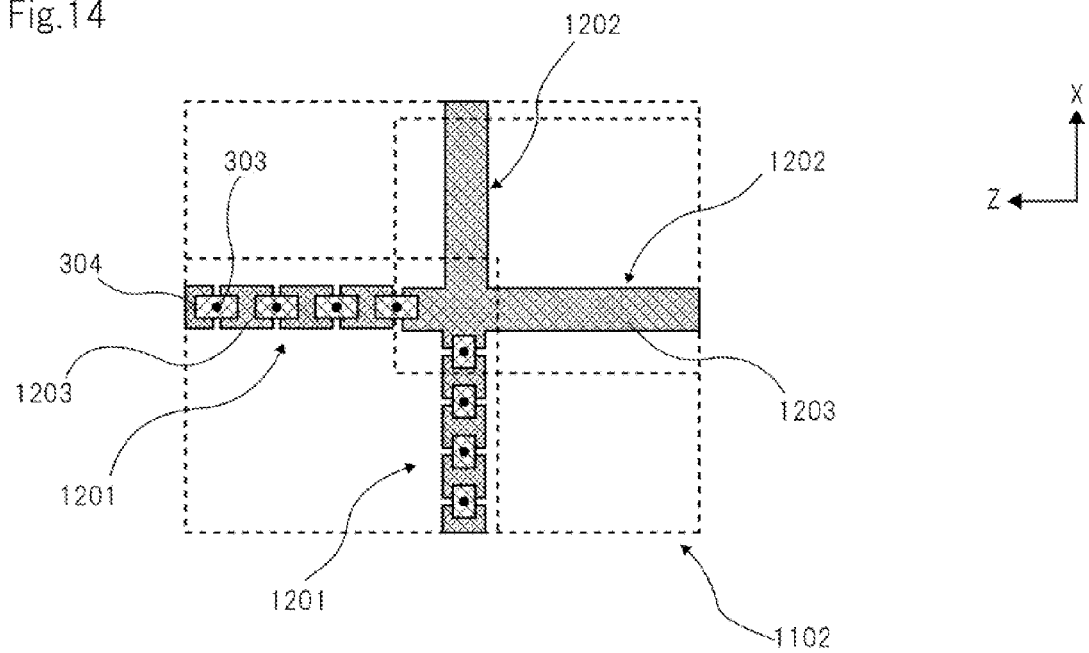
FIG. 14 is a side view showing a unit structure of the propagation sheet according to the fifth embodiment.
Figure 15:
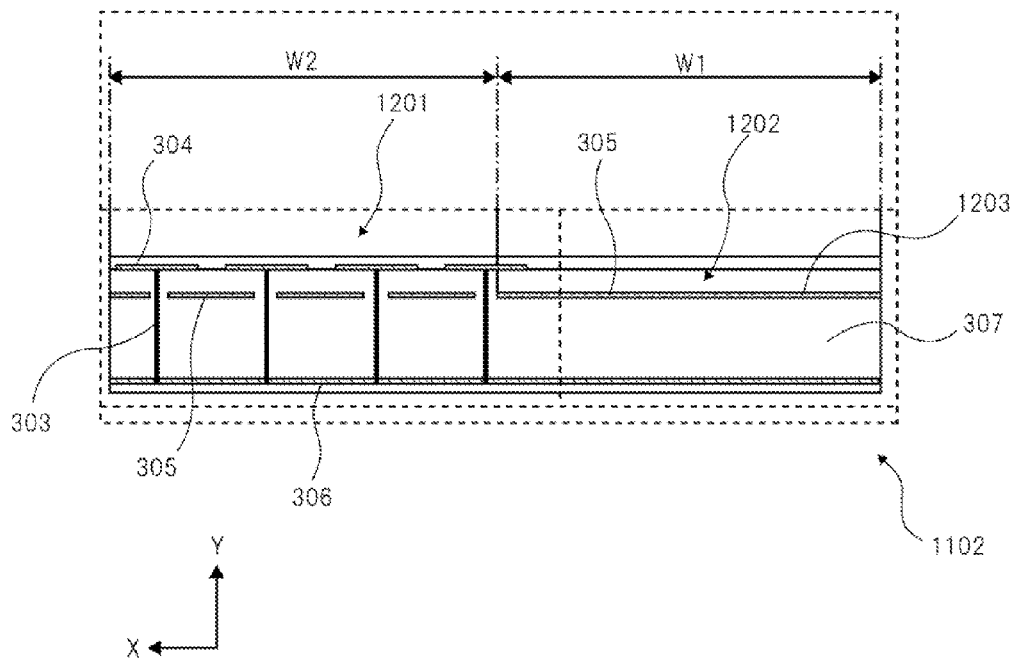
FIG. 15 is a side view showing the propagation sheet according to the fifth embodiment.

FIG. 13 is a plan view showing propagation sheet 1101 included in electromagnetic wave propagation unit 104. FIG. 14 is a plan view showing unit structure 1102 of propagation sheet 1101. FIG. 15 is a side view showing unit structure 1102.

As shown in FIG. 14 and FIG. 15, propagation sheet 1101 includes microstrip continuous area 1202 as a first area where microstrip line 1203 is continuously laid, and microstrip cutting area 1201 as a second area where microstrip line 1203 is periodically cut. As shown in FIG. 15, microstrip continuous area 1202 includes microstrip line 1203 as an intermediate conductor layer, and ground conductor 306 as a conductor layer. Microstrip cutting area 1201 has a periodic structure where upper layer patch 304 constituting an upper conductor layer and microstrip line 1203 are alternately arranged in an extending direction. In microstrip cutting area 1201, as in the case of the configuration shown in FIG. 3, upper layer patch 304 and ground conductor 306 are electrically connected to each other via conductor post 303.

In the configuration shown in FIG. 15, in microstrip continuous area 1202, microstrip line 1203 is laid on the intermediate conductor layer. However, microstrip line 1203 can be laid on the upper conductor layer. Similar effects can be provided.

A relationship between the length W1 of microstrip continuous area 1202 in an X axis direction and a magnetic permeability μ1 of dielectric layer 307 and the length W2 of microstrip cutting area 1201 in the X axis direction and an equivalent magnetic permeability μ2 of propagation sheet 1101 in the X axis direction in unit structure 1102, approximately represented by following expression (3) is satisfied.

$$W2/W1=|\mu1/\mu2| \quad (3)$$

Figure 16:
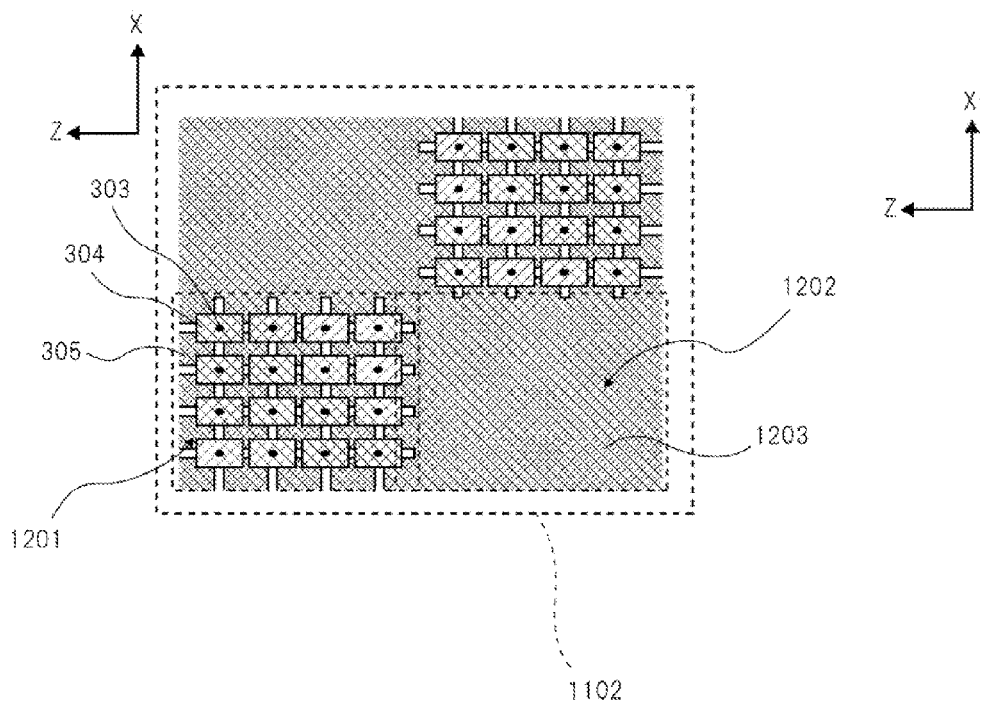
FIG. 16 is a plan view showing another unit structure of the propagation sheet according to the fifth embodiment.

In FIG. 13 and FIG. 14, microstrip continuous area 1202 and microstrip cutting area 1201 are arranged in a net shape. However, as shown in FIG. 16, these areas can be arranged two-dimensionally in X axis and Z axis directions. In this case, microstrip cutting area 1201 is similar to that shown in FIG. 3, and microstrip continuous area 1202 is a flat plate conductor layer parallel to ground conductor 306 located below.

According to the embodiment, as in the case of the first to fourth embodiments, forming propagation sheet 1101 of the periodic structure enables efficient transmission of power between electromagnetic wave transmission unit 101 and electromagnetic wave reception unit 105.

Sixth Embodiment

Figure 17:
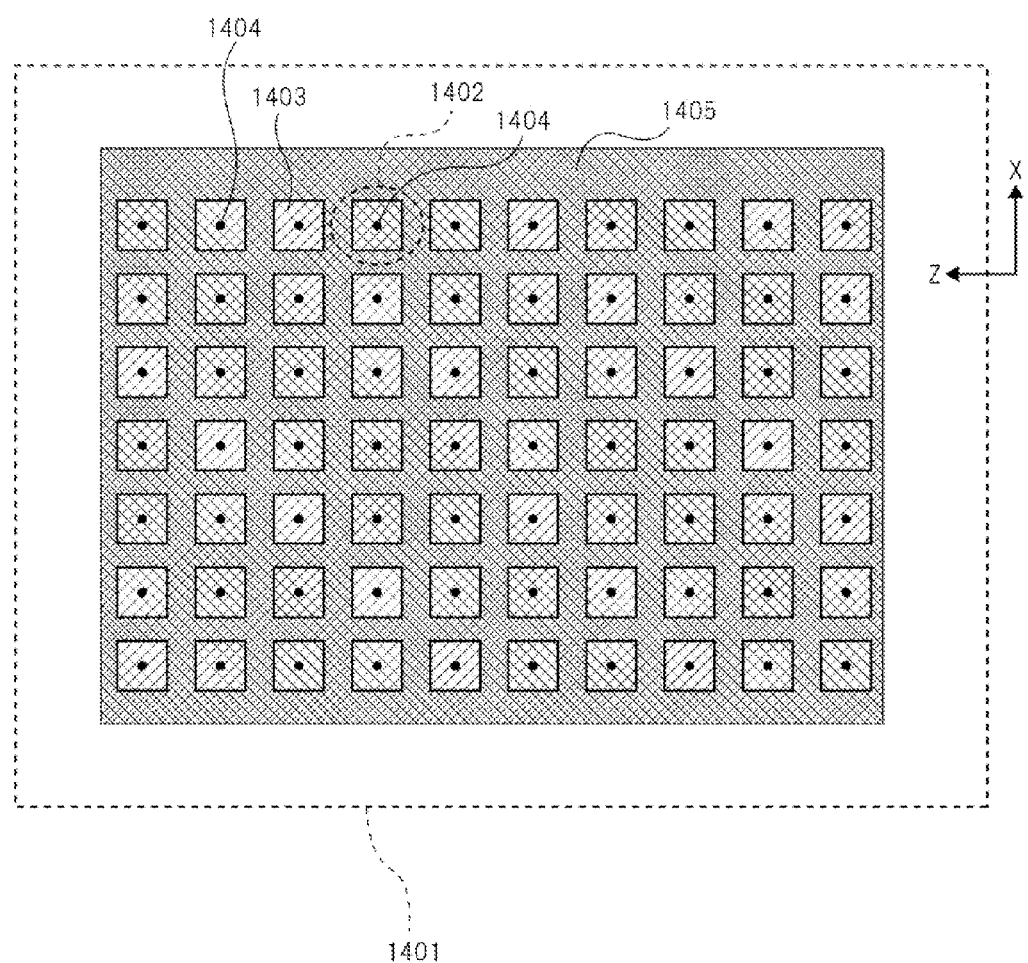
FIG. 17 is a plan view showing a propagation sheet according to a sixth embodiment.
Figure 18:
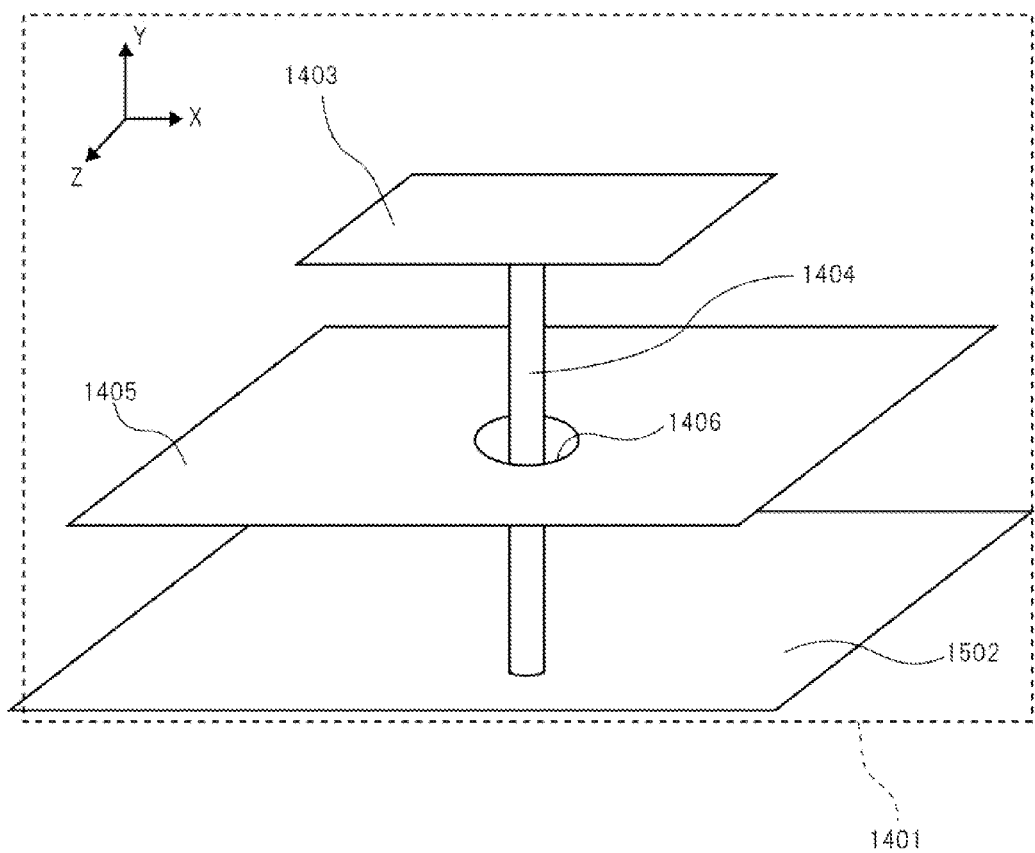
FIG. 18 is a schematic view showing a unit structure of the propagation sheet according to the sixth embodiment.

FIG. 17 is a plan view showing propagation sheet 1401 included in electromagnetic wave propagation unit 104 according to a sixth embodiment. FIG. 18 is a perspective view schematically showing unit structure 1402 of propagation sheet 1401. Upper layer patch 1403 constituting an upper conductor layer is formed on propagation sheet 1401. Upper layer patch 1403 and ground conductor 1502 are electrically connected to each other via conductor post 1404. Intermediate conductor layer 1405 is formed into a planar shape larger in area than upper layer patch 1403, and disposed in an extending direction of propagation sheet 1401. Intermediate conductor layer 1405 has through-hole 1406. Intermediate conductor layer 1405 and conductor post 1404 are electrically insulated from each other by inserting conductor post 1404 into through-hole 1406 of intermediate conductor layer 1405 without any contact. This is the feature of the embodiment.

As shown in FIG. 17, according to the embodiment, electromagnetic wave propagation unit 104 is characterized in that a plurality unit structures 1402 are periodically arranged. Dielectric layer 307 that is an insulating layer is formed between upper layer patch 1403 and intermediate conductor layer 1405 and between intermediate conductor layer 1405 and ground conductor 1502. Thus, the configuration where the dielectric layer is formed to prevent conductor contact between upper layer patch 1403 and electromagnetic wave transmission unit 101 or between upper layer patch 1403 and electromagnetic wave reception unit 105 is similar to that shown in FIG. 4.

Figure 19:
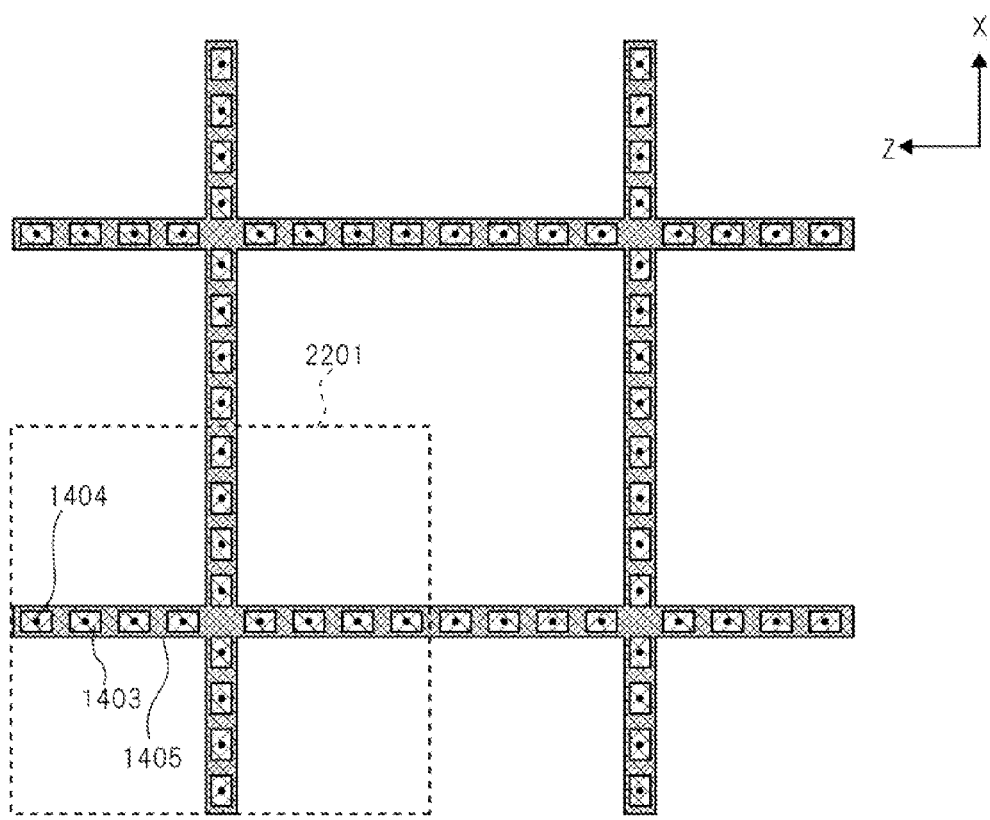
FIG. 19 is a plan view showing a case where a periodic structure of the propagation sheet is formed into a net shape according to the sixth embodiment.

FIG. 17 shows the configuration where unit structures 1402 are periodically arranged in a two-dimensional direction (X axis and Z axis directions). However, as shown in FIG. 19, unit structures 1402 can be arranged in a two-dimensional net shape. As shown in FIG. 19, the propagation sheet includes a unit structure 2201 of a two-dimensional net structure.

The formation of unit structure 2201 into the net structure provides an effect of reducing coupling loss of electromagnetic waves by forming electromagnetic wave transmission unit 101 or electromagnetic wave reception unit 105 into a predetermined structure.

According to the embodiment, as in the case of the first to fifth embodiments, forming propagation sheet 1401 of the periodic structure enables efficient transmission of power between electromagnetic wave transmission unit 101 and electromagnetic wave reception unit 105.

Seventh Embodiment

Figure 20:
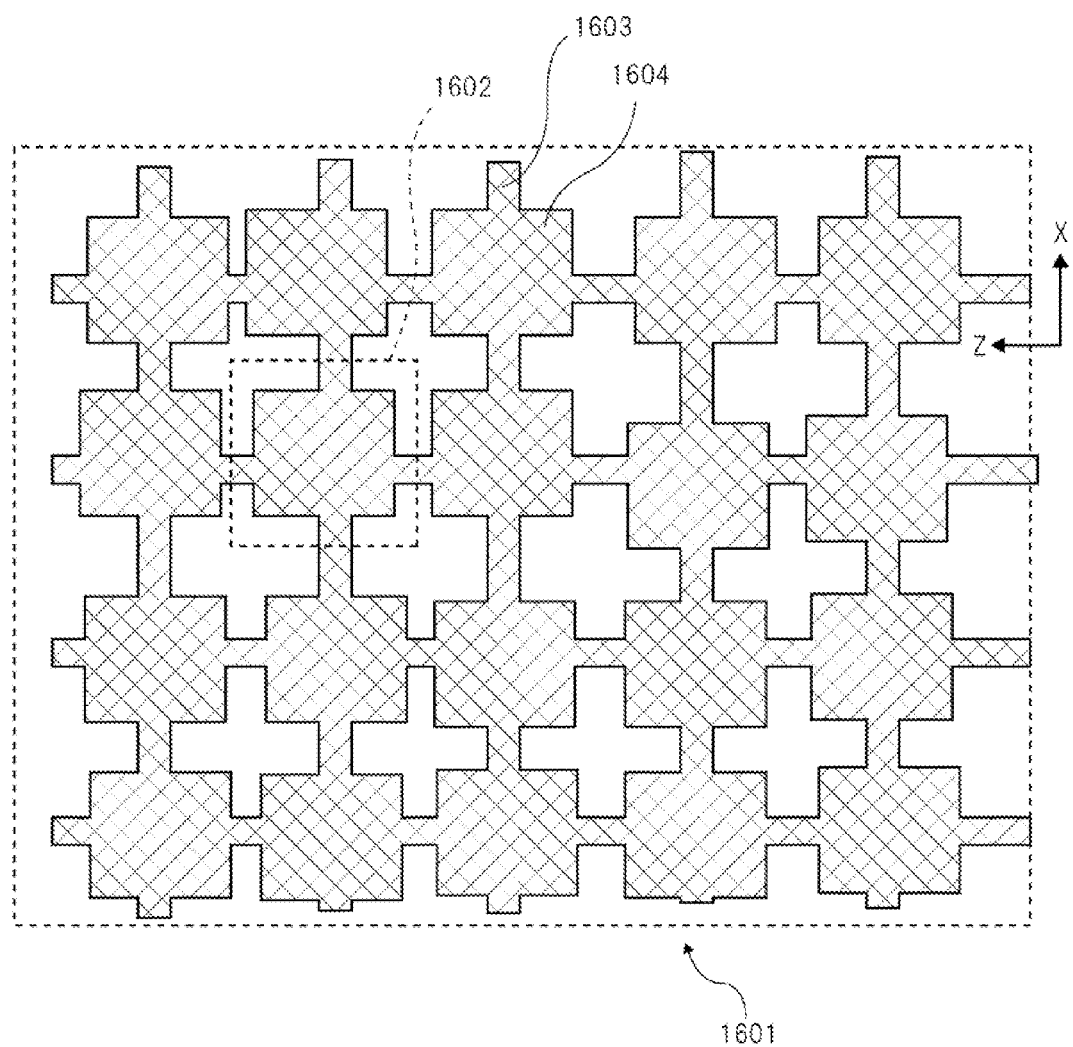
FIG. 20 is a plan view showing a propagation sheet according to a seventh embodiment.

FIG. 20 is a plan view showing propagation sheet 1601 included in electromagnetic wave propagation unit 104 according to a seventh embodiment. As shown in FIG. 20, propagation sheet 1601 has unit structure 1602. Propagation sheet 1601 includes microstrip line 1603 and square conductor patch 1604 similar to those of the net structure relating to the present invention. Conductor patch 1604 is electrically connected to microstrip line 1603 formed smaller in width than a side of conductor patch 1604 on the same plane. Conductor patches 1604 adjacent to each other are connected to each other by microstrip line 1603. A plane on which unit structure 1602 and microstrip line 1603 are arranged faces a ground conductor (reference conductor plane) located immediately below. In FIG. 20, in place of square conductor patch 1604, a polygonal conductor patch or a conductor patch of a shape having a smooth curvature can be used. For example, a hexagonal or circular conductor patch can be used.

Figure 21:
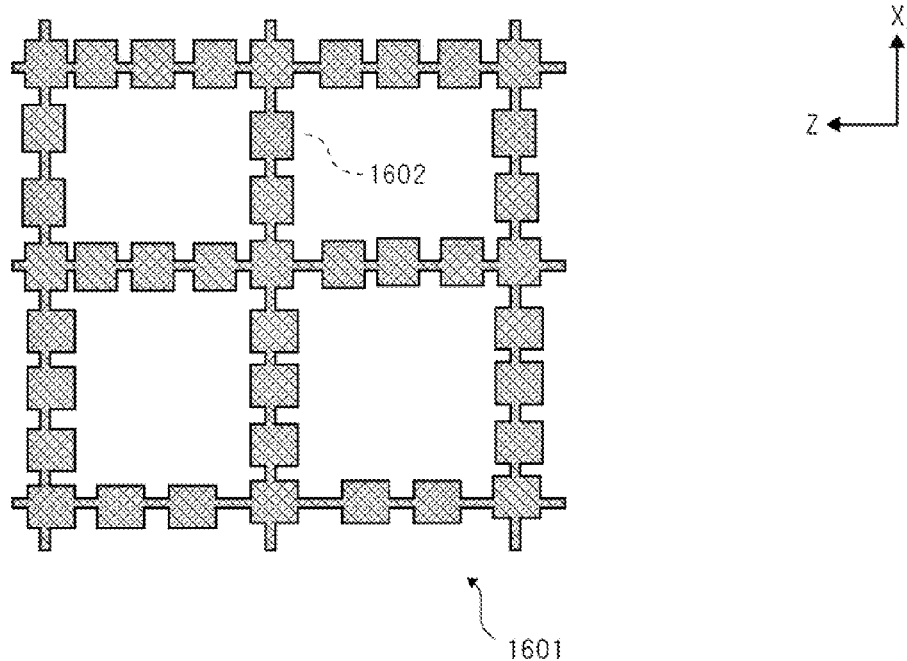
FIG. 21 is a plan view showing a case where a periodic structure of the propagation sheet is formed into a net shape according to the seventh embodiment.

FIG. 20 shows a configuration where a plurality of unit structures 1602 are arranged in a two-dimensional direction (X axis and Z axis directions). However, as shown in FIG. 21, unit structures 1602 can be arranged in a two-dimensional net shape.

The formation of unit structure 1602 into the net structure provides an effect of reducing coupling loss of electromagnetic waves by forming electromagnetic wave transmission unit 101 or electromagnetic wave reception unit 105 into a predetermined structure.

According to the embodiment, as in the case of the first to sixth embodiments, forming propagation sheet 1601 of the periodic structure enables efficient transmission of power between electromagnetic wave transmission unit 101 and electromagnetic wave reception unit 105.

Lastly, a rationale for the effect of each embodiment is described.

First, rationales for the effects of the first embodiment, the second embodiment, the sixth embodiment, and the seventh embodiment are described.

Generally, when metal conductors having unit structures formed into predetermined shapes are periodically arranged two-dimensionally, a wavelength λg of an electromagnetic wave propagated in a two-dimensional direction in a traveling direction depends on a frequency. The wavelength λg can be longer or shorter than a wavelength a of an air space. By employing, for electromagnetic wave propagation unit 104 of the surface communication apparatus, a unit structure where the wavelength λg is sufficiently larger than the length of the propagation sheet of electromagnetic wave propagation unit 104 in the extending direction, any standing wave node is prevented from occurring on the propagation sheet. Thus, in this case, the positional relationship between electromagnetic wave transmission unit 101 or electromagnetic wave reception unit 105 and electromagnetic wave propagation unit 104 affects communication performance more greatly than in the case of the related art of the present invention where the propagation sheet included in the electromagnetic wave propagation unit is used. Attention is paid to equivalence of the sufficiently larger wavelength λg of the electromagnetic wave in the traveling direction than the length of the propagation sheet in the extending direction and a sufficiently small phase change of the electromagnetic wave in an arbitrary place in the surface of the propagation sheet.

Figure 22A:
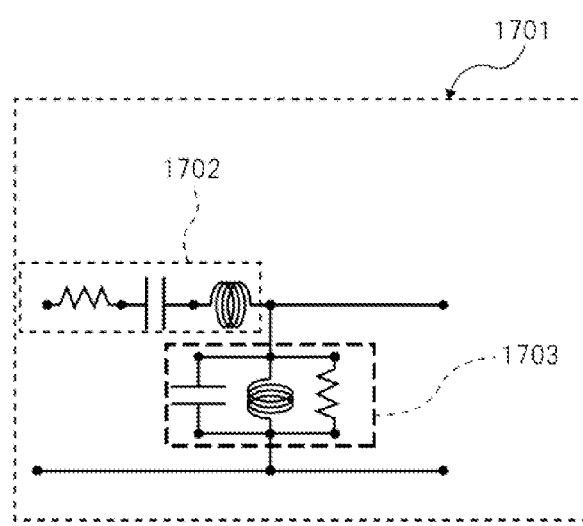
FIG. 22A is a circuit view showing an equivalent circuit corresponding to the unit structure according to the first embodiment.
Figure 22B:
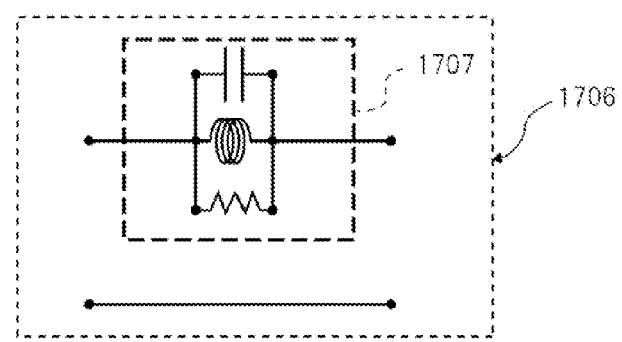
FIG. 22B is a circuit view showing an equivalent circuit corresponding to the unit structure according to the second embodiment or the unit structure according to the seventh embodiment.
Figure 22C:
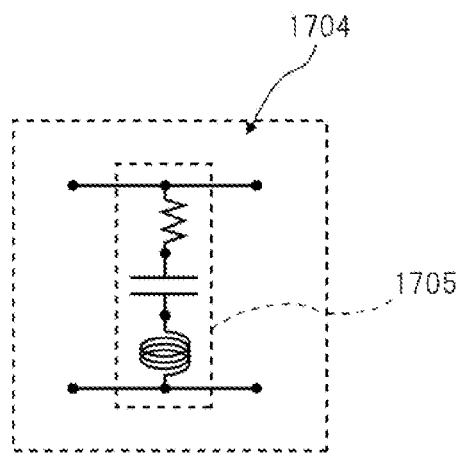
FIG. 22C is a circuit view showing an equivalent circuit corresponding to the unit structure according to the sixth embodiment.

A relationship between the wavelength λg of the electromagnetic wave in the traveling direction and a frequency depends on an equivalent circuit that simply represents propagation of electromagnetic waves in the unit structure. FIG. 22A is a circuit view showing equivalent circuit 1701 corresponding to unit structure 301 according to the first embodiment. FIG. 22B is a circuit view showing equivalent circuit 1706 corresponding to unit structure 502 according to the second embodiment or unit structure 1602 according to the seventh embodiment. FIG. 22C is a circuit view showing equivalent circuit 1704 corresponding to unit structure 1401 according to the sixth embodiment.

As shown in FIG. 22A, equivalent circuit 1701 includes serial resonance circuit 1702 and parallel resonance circuit 1703. As shown in FIG. 22B, equivalent circuit 1706 includes parallel resonance circuit 1707. As shown in FIG. 22C, equivalent circuit 1704 includes serial resonance circuit 1705.

Figure 23:
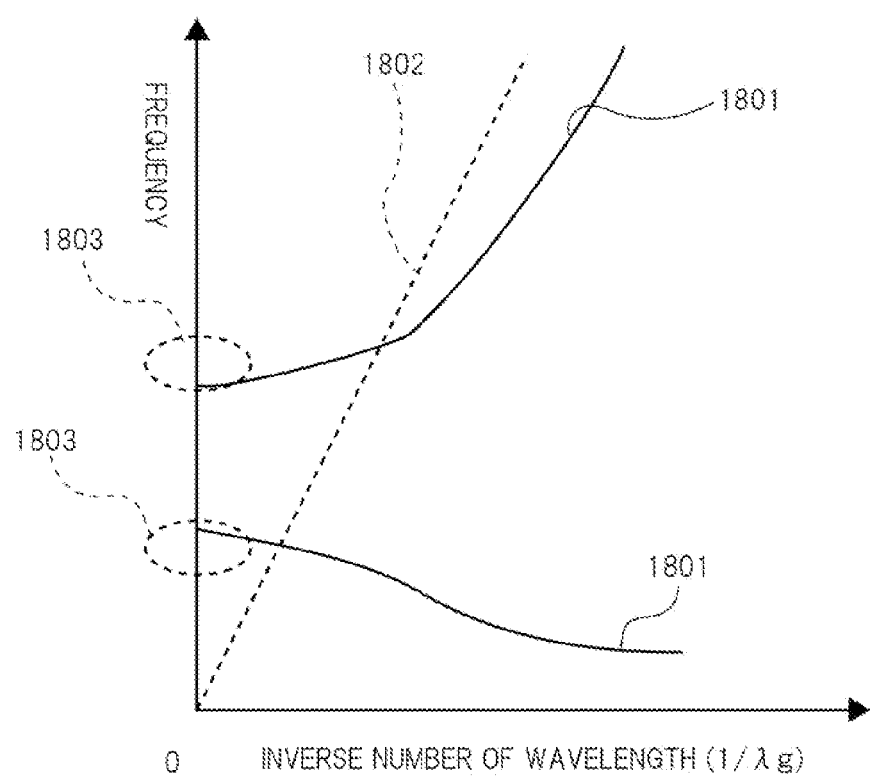
FIG. 23 shows a relationship between a wavelength and a frequency of an electromagnetic wave in a sheet direction when unit structures corresponding to equivalent circuits are periodically arranged.

A relationship between the wavelength λg of the electromagnetic wave in the traveling direction and a frequency at equivalent circuit 1701 is qualitatively represented as shown in FIG. 23. In FIG. 23, curve 1801 indicates a relationship between the frequency and the wavelength λg when unit structures corresponding to equivalent circuits 1706 are periodically arranged. Straight line 1802 indicates a relationship between a wavelength λ0 of the electromagnetic wave in vacuum and the frequency. As shown in FIG. 23, when curve 1801 appears to the left shown of straight line 1802, the wavelength λg is longer than the wavelength λo in vacuum. FIG. 23 shows frequency band 1803 where the wavelength λg becomes extremely large. Thus, in the surface communication apparatus, by setting a size or a material constant of unit structure 301 so that the electromagnetic wave propagated through the propagation sheet can be within frequency band 1803, the wavelength λg in the traveling direction can be sufficiently larger than the length of the propagation sheet in then extending direction.

Specifically, input/output characteristics of the unit structure having a designated size or material constant, namely, an ABCD matrix, are acquired by an electromagnetic field simulator, actual measurement or equivalent circuit analysis. Then, by applying Bloch theorem to the ABCD matrix, a wavelength λg can be acquired with respect to each frequency. Thus, curve 1801 shown in FIG. 23 only needs to be compared with another for every permissible size parameter and material constant parameter, thereby selecting an optimal combination of a size parameter and a material constant. As a result, unit structure 301 can be configured so that an electromagnetic wave propagated through the propagation sheet can be within frequency band 1803.

Figure 24:
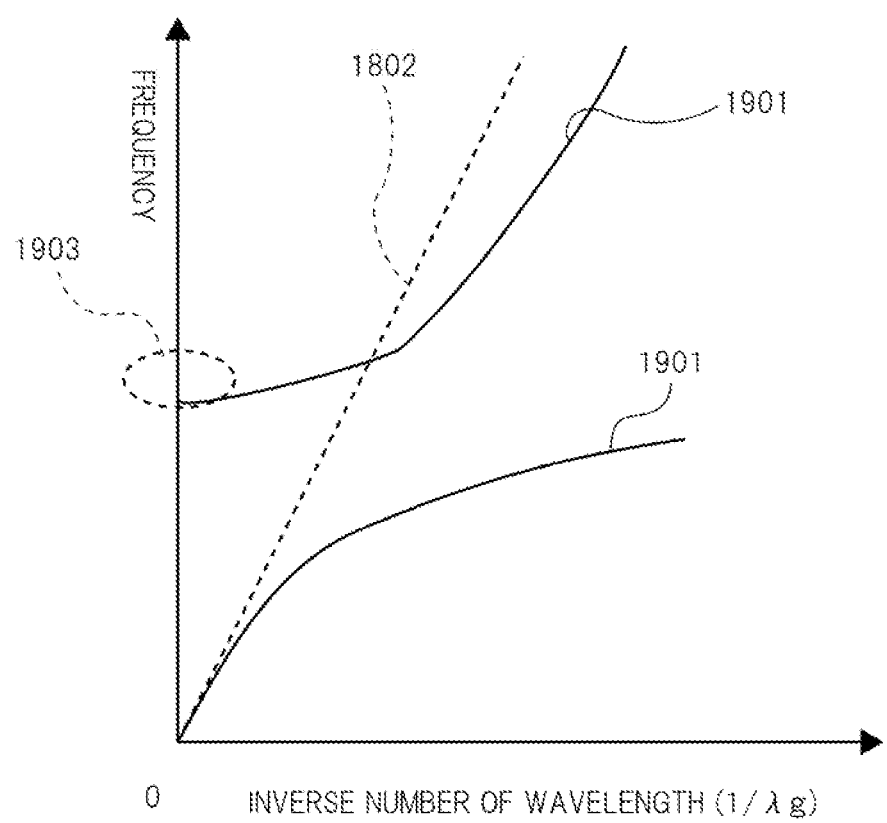
FIG. 24 shows a relationship between a wavelength and a frequency of an electromagnetic wave in a sheet direction when unit structures corresponding to equivalent circuits are periodically arranged.

For the case where unit structures 502 or unit structures 1601 corresponding to equivalent circuits 1704 or equivalent circuits 1706 are periodically arranged, a relationship between the wavelength λg in the extending direction of the propagation sheet and the frequency is as qualitatively indicated by curve 1901 shown in FIG. 24. Similarly, in this case, attention is paid to the presence of frequency band 1903 where the wavelength λg in the traveling direction becomes extremely large. In other words, in the surface communication apparatus, by setting a size or a material constant for unit structure 502 or unit structure 1602 so that the electromagnetic wave propagated through the propagation sheet can be within frequency band 1903, the wavelength λg in the traveling direction can be set sufficiently, larger than the length of the propagation sheet in the extending direction.

Specifically, input/output characteristics of the unit structure having a designated size or material constant, namely, an ABCD matrix, are acquired by an electromagnetic field simulator, actual measurement or equivalent circuit analysis, and then Bloch theorem is applied to the ABCD matrix. A wavelength λg can accordingly be acquired with respect to each frequency. Thus, curve shown in FIG. 24 only needs to be compared with another for every permissible size parameter and material constant parameter, thereby selecting an optimal combination of a size parameter and a material constant. As a result, unit structure 502 or unit structure 1602 can be configured so that an electromagnetic wave propagated through the propagation sheet can be within frequency band 1903.

Next, rationales for the effects of the fourth embodiment and the fifth embodiment are described. Generally, in the case of a double positive material where a dielectric constant $\in1$ and a magnetic permeability μ1 both have positive values, the propagation direction of electromagnetic wave energy and the propagation direction of a phase are identical. On the other and, in the case of a double negative material where dielectric constant $\in2$ and magnetic permeability μ2 both have negative values, the propagation direction of electromagnetic wave energy and the propagation direction of a phase are reverse. Thus, it has been confirmed that when the two types of materials are arranged adjacently to each other, and an electromagnetic wave enters from one end, energy of the electromagnetic wave can theoretically reach the other end, causing almost no change in phase.

To achieve the abovementioned operations, in the adjacent portions of the two types of materials, a condition where an electromagnetic wave is not reflected and a condition where a path difference of an electromagnetic wave at each material is "0" are represented by following expressions (4) and (5).

$$\sqrt{(\mu1/\in1)} = \sqrt{(\mu2/\in2)} \qquad (4)$$

$$W1\sqrt{(\mu1 \cdot \in1)} = W2\sqrt{(\mu2 \cdot \in2)} \qquad (5)$$

In expression (5), W1 denotes the length of a double positive material in the traveling direction of the electromagnetic wave, and W2 denotes a double negative material in the traveling direction of the electromagnetic wave.

When expressions (4) and (5) are combined, the relationship represented by expression (3) is established between the length W1 and a magnetic permeability μ1 of the double positive material and the length W2 and a magnetic permeability μ2 of the double negative material in the traveling direction of the electromagnetic wave.

Thus, sizes of the double positive material and the double negative material are adjusted to satisfy expression (3), and a structure where the double positive and double negative materials are alternately arranged to be adjacent to each other is set as a unit structure in the extending direction of the propagation sheet included in the electromagnetic propagation unit according to the present invention. Then, the sheet is formed into a periodic structure of the unit structure, thereby causing almost no change in phase at the propagation sheet.

It is known that in the structure of second dielectric area 905 shown in FIG. 12 or the transmission line structure of microstrip line cutting area 1201 shown in FIG. 14, a double negative material can be determined at a specific frequency. Thus, by electromagnetic field simulation, the size of a structure exhibiting double negative material characteristics with respect to the propagation frequency of an electromagnetic wave is estimated, and the size of the double positive material is adjusted to satisfy expression (3). By applying the structure where the double positive and double negative materials are alternately arranged to be adjacent to each other to the electromagnetic wave transmission unit according to the present invention, almost no change occurs in phase at the propagation sheet.

Next, a rationale for the effect of the third embodiment is described.

It can be understood that in expression (3), in the double positive material and the double negative material arranged to be adjacent to each other, phases are synchronized between the entrance side and the output side of the electromagnetic wave, and hence resonance can be determined.

Thus, in the structure shown in FIG. 9A and FIG. 9B, resonance can be generated in a thickness direction of propagation sheet 701. This means that the electromagnetic wave has a frequency ky in the thickness direction of propagation sheet 701. A frequency kx or a frequency kz in the extending direction of propagation sheet 701 is accordingly smaller than that when the frequency ky becomes zero. In the propagation sheet, the wavelength λg in the traveling direction of the electromagnetic wave is inversely proportional to the frequency Kx or the frequency kz. Thus, in the thickness direction of propagation sheet 701, when expression (1) is satisfied, the wavelength λg is larger than that when a structure where the frequency kx becomes almost zero is used. In the structure shown in FIG. 9A and FIG. 9B, there are more electromagnetic wave modes that satisfy expression (1) than conventional modes where the frequency ky becomes almost zero. In the modes, there are more than a few components where the wavelength λg in the traveling direction of the electromagnetic wave is sufficiently larger than the length of the propagation sheet, namely, components where almost no change occurs in the propagation sheet. As a result, the structure according to the embodiment can make more difficult the generation of standing waves in the extending direction of the propagation sheet than the structure of the related art of the present invention.

The embodiments of the present invention have been described. However, the embodiments are only examples. As can be understood by those skilled in the art, various modifications can be made of the combination of the components, and such modifications are within the present invention.

The embodiments of the present invention have been described. However, the embodiments are in no way limitative of the present invention. Various changes understandable to those skilled in the art can be made of the configuration and the details of the present invention within the scope of the invention.

This application claims priority from Japanese Patent Application No. 2009-117697 filed May 14, 2009, which is hereby incorporated by reference herein in its entirety.

The invention claimed is:

1. A surface communication apparatus comprising:
    a sheet-shaped electromagnetic wave propagation unit which propagates electromagnetic waves;
    an electromagnetic wave transmission unit which is disposed on a surface of the electromagnetic wave propagation unit and transmits electromagnetic waves to the electromagnetic wave propagation unit; and
    an electromagnetic wave reception unit which is disposed on the surface of the electromagnetic wave propagation unit and receives the electromagnetic waves propagated through the electromagnetic wave propagation unit,
    wherein:
    the electromagnetic wave transmission unit includes an electromagnetic wave generator and a transmission electromagnetic wave coupler which couples electromagnetic waves generated by the electromagnetic wave generator with the electromagnetic wave propagation unit;
    the electromagnetic wave reception unit includes a reception electromagnetic wave coupler which couples the electromagnetic waves propagated through the electromagnetic wave propagation unit, and an electromagnetic wave output unit which outputs the electromagnetic waves coupled by the reception electromagnetic wave coupler; and
    the electromagnetic wave propagation unit has a periodic structure that sets wavelengths of the electromagnetic waves propagated through the electromagnetic wave propagation unit to be longer than the length of the sheet-shaped electromagnetic wave propagation unit in an extending direction.

2. The surface communication apparatus according to claim 1, wherein in the electromagnetic wave propagation unit, an angle of a phase difference of the electromagnetic waves propagated in the extending direction is set within 90 degrees with respect to a transmission frequency of the electromagnetic wave transmission unit.

3. The surface communication apparatus according to claim 1, wherein:
    the electromagnetic wave propagation unit is formed into a three-layer structure that includes an upper conductor layer having a plurality of upper layer patches arranged on a side abutting on the electromagnetic wave transmission unit, an intermediate conductor layer having a plurality of intermediate layer patches, and a lower conductor layer formed in the extending direction; and
    the electromagnetic wave propagation unit has the periodic structure where the upper layer patches of the upper conductor layer and the intermediate layer patches of the intermediate conductor layer are alternately arranged in the extending direction, and includes a conductor post which electrically connects the upper layer patches of the upper conductor layer to the lower conductor layer.

4. The surface communication apparatus according to claim 3, wherein the electromagnetic wave propagation unit includes a unit structure that has the periodic structure and the conductor post, and a plurality of unit structures are arranged in a net shape.

5. The surface communication apparatus according to claim 1, wherein:
    the electromagnetic wave propagation unit is formed into a three-layer structure that includes an upper conductor layer having a plurality of upper layer patches arranged on a side abutting on the electromagnetic wave transmission unit, an intermediate conductor layer having a plurality of intermediate layer patches, and a lower conductor layer formed in the extending direction; and the electromagnetic wave propagation unit has the periodic structure where the upper layer patches of the upper conductor layer and the intermediate layer patches of the intermediate conductor layer are alternately arranged in the extending direction, and includes a conductor post which electrically connects the upper layer patches of the upper conductor layer to the intermediate layer patches of the intermediate conductor layer.

6. The surface communication apparatus according to claim 5, wherein the electromagnetic wave propagation unit includes a unit structure that has the periodic structure and the conductor post, and a plurality of unit structures are arranged in a net shape.

7. The surface communication apparatus according to claim 1, wherein:

the electromagnetic wave propagation unit is formed into a two-layer structure that includes an upper conductor layer formed on a side abutting on the electromagnetic wave transmission unit, and a lower conductor layer formed in the extending direction;

the upper conductor layer is a wiring layer formed into a net shape;

a first layer including a first medium and a second layer including a second medium and the periodic structure are formed between the wiring layer and the lower conductor layer;

a dielectric constant and a magnetic permeability of the first medium both have positive values; and a dielectric constant and a magnetic permeability of the second medium both have negative values.

8. The surface communication apparatus according to claim 7, wherein the second layer includes the periodic structure where split ring resonators and linear wires are alternately arranged in the extending direction.

9. The surface communication apparatus according to claim 1, wherein:

the electromagnetic wave propagation unit is formed into a two-layer stricture that includes an upper conductor layer formed on a side abutting on the electromagnetic wave transmission unit, and a lower conductor layer formed in the extending direction;

the upper conductor layer which is a wiring layer formed into a net shape;

the periodic structure where a first area including a first medium and a second area including a second medium are periodically arranged in the extending direction is disposed between the wiring layer and the lower conductor layer;

a dielectric constant and a magnetic permeability of the first medium both have positive values; and a dielectric constant and a magnetic permeability of the second medium both have negative values.

10. The surface communication apparatus according to claim 9, wherein the second area includes a periodic structure where split ring resonators and linear wires are alternately arranged in a thickness direction of the electromagnetic wave propagation unit.

11. The surface communication apparatus according to claim 3, wherein:

the electromagnetic wave propagation unit is formed into the three-layer structure that includes the upper conductor layer having the plurality of upper layer patches arranged on the side abutting on the electromagnetic wave transmission unit, the intermediate conductor layer having the plurality of intermediate layer patches, and the lower conductor layer formed in the extending direction;

and wherein said three layer structure includes a first area having the upper conductor layer or the intermediate conductor layer, and the lower conductor layer, and includes a second area having the upper conductor layer, the intermediate conductor layer, the lower conductor layer, and a conductor post which conducts the upper layer patches of the upper conductor layer to the lower conductor layer that are formed into the periodic structure where the upper layer patches of the upper conductor layer and the intermediate layer patches of the intermediate conductor layer are alternately arranged in the extending direction; and the first area and the second area are periodically arranged in the extending direction.

12. The surface communication apparatus according to claim 11, wherein the electromagnetic wave propagation unit includes a unit structure having the first area and the second area, and a plurality of unit structures are arranged in a net shape.

13. The surface communication apparatus according to claim 11, wherein:

the electromagnetic wave propagation unit is formed into the three-layer structure that includes the upper conductor layer having the plurality of upper layer patches arranged on the side abutting on the electromagnetic wave transmission unit, the intermediate conductor layer, and the lower conductor layer that is formed in the extending direction;

the intermediate, conductor layer is formed into a planar shape larger in area than the upper layer patch of the upper conductor layer, and includes a through-hole; and the electromagnetic wave propagation unit includes a conductor post which is inserted into the through-hole of the intermediate conductor layer without any contact and which electrically connects the upper layer patches of the upper conductor layer to the lower conductor layer.

14. The surface communication apparatus according to claim 13, wherein the electromagnetic wave propagation unit includes a unit structure that has the upper conductor layer, the intermediate conductor layer, and the conductor post, and a plurality of unit structures are arranged in a net shape.

15. The surface communication apparatus according to claim 1, wherein:

the electromagnetic wave propagation unit is formed into a two-layer structure that includes an upper conductor layer having a plurality of conductor patches formed on a side abutting on the electromagnetic wave transmission unit, and a lower conductor layer formed in the extending direction; and the upper conductor layer has a periodic structure where the conductor patches are arranged in the extending direction, and a wire which is formed smaller in width than a side of the conductor patches and which electrically connects the adjacent conductor patches to each other.

16. The surface communication apparatus according to claim 15, wherein in the electromagnetic wave transmission unit, the conductor patches and the wire are arranged in a net shape.

* * * * *